Oct. 1, 1935.    H. AHLQVIST    2,015,832
LIXIVIATOR AND METHOD OF LEACHING
Filed March 2, 1931    2 Sheets-Sheet 2

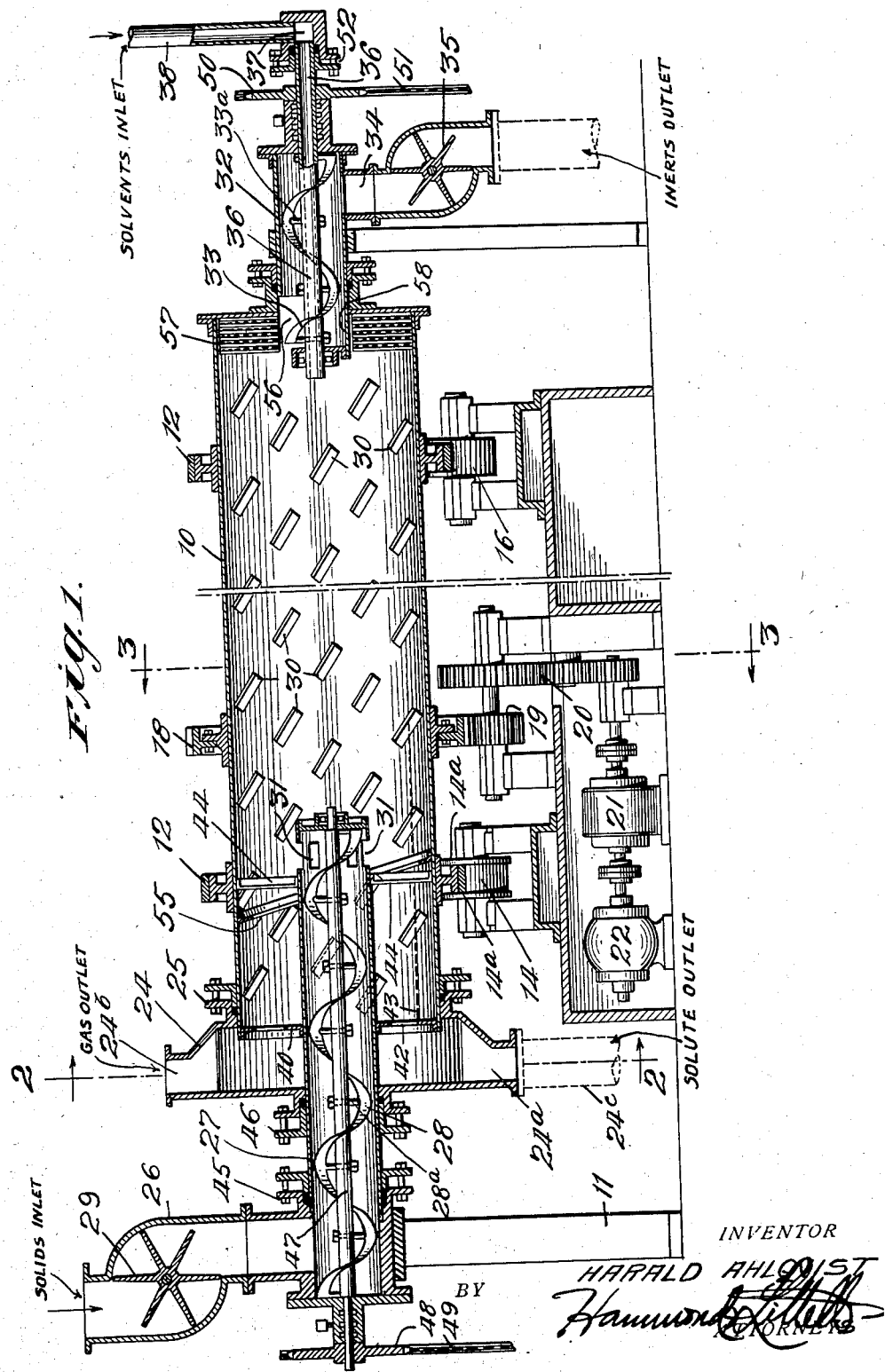

INVENTOR
HARALD AHLQVIST
BY
ATTORNEYS

Patented Oct. 1, 1935

2,015,832

UNITED STATES PATENT OFFICE 2,015,832

LIXIVIATOR AND METHOD OF LEACHING

Harald Ahlqvist, Rye, N. Y.

Application March 2, 1931, Serial No. 519,702

12 Claims. (Cl. 23—269)

This invention relates to a lixiviating apparatus and process for dissolving soluble materials out of a mixture or compound of such soluble material and insoluble material by leaching or the like.

In many metallurgical and chemical industries the separation of valuable matter from inert matter is accomplished by dissolving the valuable soluble matter in a solvent in which the inert matter is insoluble. The same process is often used to effect a separation of two or more materials which may all be soluble in the solvent but to a different degree by a careful regulation of flow condition and choice of solvents. The apparatus used in such process has often heretofore been objectionable because of escape of obnoxious or expensive gases or vapors and because of the lack of continuity of operation.

It is the principal object of this invention to provide an apparatus for leaching which will continuously dissolve out soluble matter from a mass of soluble and insoluble material and in which the raw material is continuously introduced into one end of the lixiviator and the separated materials are continuously removed from other parts of the lixiviator.

A further object of the invention is to provide a lixiviation apparatus in which a gaseous instead of a liquid solvent medium may be used to dissolve out certain ingredients of the solids, or in which the leaching may be carried out under superatmospheric pressures or in which a gaseous medium may be passed counter current to a liquid medium to effect selective separation of parts thereof.

A further object of this invention is to provide a lixiviator with a continuous counter-current flow of solvents and solids in which the solvent is separately introduced under suitable control and is removed at the end opposite the discharge of the solids to provide complete treatment and whereby the strongest solvent acts on the more completely leached solids and the weaker solvent is most effectively used on the incoming raw products.

Another object of this invention is to provide an apparatus for the automatic separation of solution and inerts whereby the solution may be subsequently treated and the inerts will be discharged substantially free of the solution of solvents and solubles.

Another object of this invention is to provide a sealed lixiviator apparatus for the leaching of soluble from insoluble materials in which the vapors or gases may be controlled without escape of obnoxious gases and whereby low boiling point solvents may be recovered with economy if desired.

A further object of this invention is to provide a lixiviator tank with a multiplicity of spaced flights in such relation as to agitate the solids and solvents introduced into the tank and continually move the undissolved material forward to the discharge end and in which the flights are loosely secured in the tank and free to move a slight amount to cause a jarring action to remove any solids which might stick to the flight.

A further object of this invention is to provide a process of lixiviation in which the solvents and solids are introduced and passed through the sealed tank in counter-current and whereby the tank vapors may be recovered and removed through one discharge, the inert solids removed through a separate discharge, and the solvent recovered from a third discharge for greatest economy and completeness of separation.

Further objects and advantages of this invention will appear from the following description thereof taken in connection with the attached drawings which disclose a preferred form of embodiment thereof and in which;

Figure 1 is a vertical section substantially centrally of the apparatus,

Figure 4:
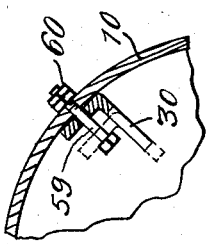

And Figure 4 is a detail section of the tank showing a modified form of flight.

Figure 3:
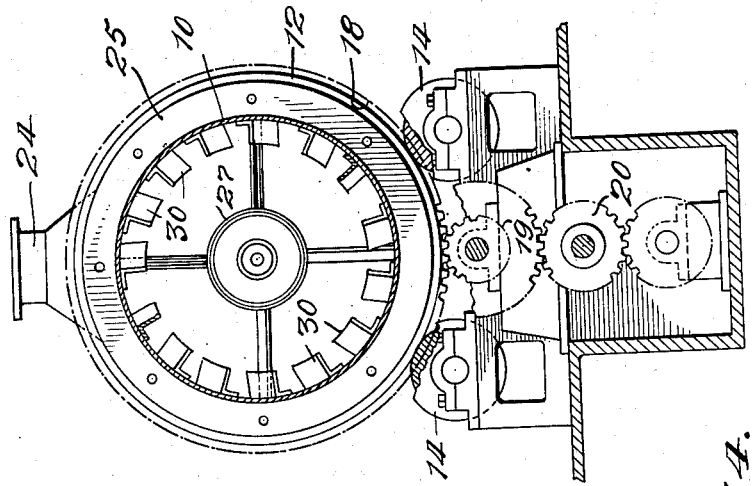
Figure 3 is a vertical cross-section substantially on the line 3—3 of Figure 1.
Figure 2:
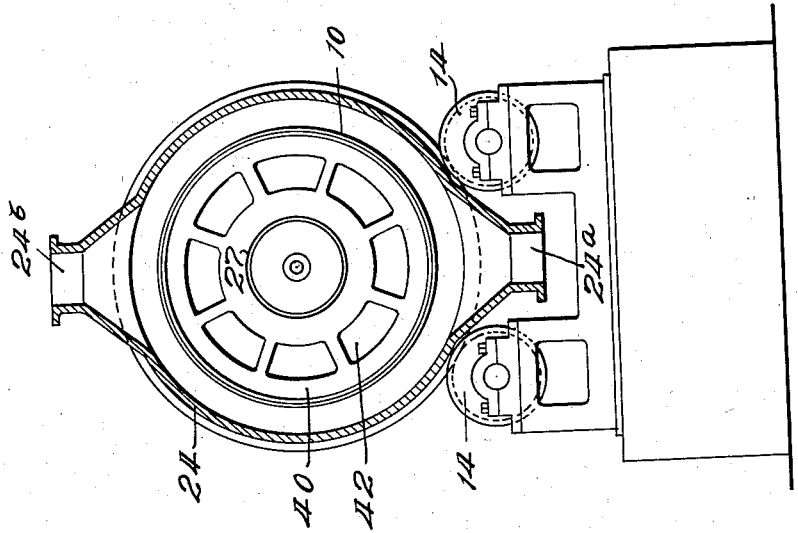
Figure 2 is a vertical cross-section substantially on the line 2—2 of Figure 1.

The lixiviator of my invention includes a cylindrical tank or drum 10 which is provided with the peripheral tires or rims 12 which support the drum on pairs of rollers 14 and 16, as more clearly shown in Figures 2 and 3.

In order to prevent longitudinal shifting of the drum 10, rollers 14 are provided with flanges 14a cooperating with the side of the track 12. The rollers 16 are flat however, so that any expansion of the drum due to the temperature change may take place on the rollers 16.

The drum 10 is also provided with a central gear 18 by which the drum 10 is driven through the gear 19, gear train 20, speed reducer 21, and motor 22, or other source of power in any preferred manner. The drum 10 is provided with a fluid discharge head 24 suitably held against rotation by the piping connections 24c which may be sealed against the escape of pressure within the drum 10, and provided with packing flanges 25 in which the drum 10 rotates in a pressure-tight manner.

The fluid discharge end of the drum 10 is also provided with a feed box for the solid material, which may be mounted on supports 11. The feed box communicates with a screw conveyor housing 27 rotating with and adapted to extend partially into the drum 10. The screw conveyor housing 27 is provided with a screw conveyor 28 preferably of the ribbon type which is adapted to receive solids which pass through the star feeder wheel 29 in the feed box 26, and which are discharged into the drum 10 by the screw conveyor 28. The star feeder wheel 29 is preferably used to seal the feed box 26 against escape of gases and pressure although other well known or preferred methods for sealing the feed chamber may be used equally as well.

The screw conveyor 27 is supported within the drum 10 by spider members 44 and by the head 40 of the drum. The conveyor housing is thus rotatable with the drum and stuffing boxes 45 and 46 are used to seal the housing from the fluid discharge head 24 and the feed box 26, thus preventing leaks. The screw conveyor 28 is preferably of the ribbon type and supported by posts 28a from the shaft 47, which shaft is driven by the sprocket 48 and chain 49.

The drum 10 is provided with a plurality of flights or upstanding angular projections 30 and are mounted on the inner surface in an overlapping progressive spiral so that the solid material will be continually raised and agitated and forced forward through the drum. The solids fed into the drum by the screw conveyor 28 thus drop through the apertures 31 in the conveyor housing 27 and drop onto the inwardly projecting flights 30. As the drum 10 continues to rotate, the solids will be continuously urged toward the discharge end of the drum where they are picked up and dropped into the solids discharge conveyor housing 32 having the solids discharge conveyor 33 therein. The solids are carried by the conveyor 33 to the solids discharge head 34 and by means of a star feeder 35 or other sealing means are discharged from the lixiviator. The flights or upstanding projections 30 are shown in end view in Figure 3, the projections extending partially toward the center of the drum and adapted to carry the material forward and agitate it.

Cooperating with the flights 30 is a spiral baffle 55 which is secured within the drum 10. This baffle in its continuous movement, aids to prevent insoluble materials from passing out of the open apertures 42 and being inadvertently discharged from the wrong end of the drum 10. The baffle 55 continuously aids to force the material forward together with the flights 30 so that it will be eventually carried up and deposited in the opening 56 in the conveyor housing 32.

The conveyor 33 is mounted on a hollow shaft 36 which is connected into the stuffing box 37 to which the solvent is piped. The screw conveyor 33, similar to the conveyor 28, is of the ribbon type and mounted free and above the hollow shaft 36 by the posts 33a which project outwardly from the shaft 36; the shaft 36 being rotatable by means of the sprocket gear 50 and driving chain 51. A suitable flange 52 is provided to seal the shaft 36 into the stuffing box 37.

The solvent passes through pipe 38 and through the hollow shaft 36 and is discharged near the discharge end of the drum 10. The liquid solution of soluble materials rest on the bottom of the drum 10 until a predetermined liquid level is reached. This liquid level is governed by the head 40 on the drum 10 which, as particularly shown in Figure 2, is provided with a series of apertures 42 which are spaced from the rim of the drum 10. As shown in Figure 1, the apertures determine a liquid level at approximately the line 43, and when the solution exceeds the level 43 it passes out of the drum through the apertures 42 and into the solution discharge end 24a of the fluid discharge head 24. At the same time any gas or vapor within the drum 10 will be discharged out of the gas discharge end 24b of the fluid discharge head 24 either by use of a vacuum pump (not shown) or because they are lighter than air.

In order to completely remove the inert solids from the drum 10 the pick up plates 57 are provided and spaced a sufficient amount so that the solid material may be worked into the space between the plates and then carried up and dropped into the chamber 56 above the discharge screw 33. The pick up plates 57 are perforated to permit draining of the solids. The lower end 58 of the conveyor housing 32 is sealed to insure the discharge movement of solids which are deposited within the conveyor housing.

In operation of the lixiviator a certain part of the raw material is to be separated from the total feed by a solvent which in special cases may also act as a flotation medium. The solids enter through the star feeder 26 which seals the entrance against escape of gases and vapors and by means of the screw conveyor are forced into the lixiviator cylinder. At the same time the solvent enters through the hollow shaft 36 at the opposite end of the continually rotating drum 10 and comes in contact with the solid materials fed into the cylinder. The pick up flights 30 carry the undissolved solids in counter-current to the flow of solvent toward the discharge end and the pick up plates 57 then discharge the solids to the discharge screw which discharges also in gas tight relation through the star feeder 35. The solvent, which is strongest as it enters the lixiviator tank, contacts with the most reduced materials reducing the final solids as much as possible. The solution then passes along the drum contacting with the material and then passes out of the head of the drum after finally contacting with the most concentrated solids, the solution being the weakest at this point. The solution may then pass through sealed pipes to storage tanks (not shown) or any other desired place for retreatment and recovery. At the same time the gases or vapors such as steam, acids, low boiling hydrocarbons, or gases or volatile liquids used as solvents pass out of the upper part of the fluid discharge head through a single conduit to a condenser or other appropriate apparatus (not shown) to be recovered and condensed if valuable or obnoxious.

For a successful operation, the relative quantities of feed and solvent must be proportioned and the proper time of contact between feed and solvent determined. If heat is to be preserved, the drum may be lagged and by means of the star feeders and the flight conveyors the rate of feed may be carefully controlled. The star feeders may not be essential however, as the material itself may act as a seal for the feeding discharge conveyors.

Such an apparatus is continuous and automatic and brings about a leaching which may be exactly controlled and by which there is a complete separation or flotation of the soluble materials from inert materials and/or non-dissolved materials. The time element may be readily changed by varying the speed of rotation of the cylinder, by varying the feeding or corresponding quantity of solvent, by changing the angle of the pick up flights and by adjusting the discharge holes in the head of the drum either closer or further from the center. The horizontal axis of the drum may be raised at one end to also vary the rate at which the solids will travel through.

In this apparatus it is possible to use other feed control means than a star feeder, which, however, is preferred for its simplicity and completeness of sealing. The ribbon screw conveyors may be of different shape and construction and may be continuous conveyors if desired. Similarly the projecting flights for agitating the materials within the drum may be changed although the separate flights are preferred for complete agitation and forward movement of the solid products. The flights may be movable as shown in Figure 4 in which the flight projection 30 may be secured to the drum 10 by a bolt 59 which has a lock nut 60 but which bolt is longer than the thickness of the flight and drum. In such construction, the flight will lie against the surface of the drum when the flight is at the bottom of the drum and will then pick up the solids on the bottom of the drum. As the drum rotates however, the solids will be carried up the side of the drum to an elevated point at which most of the solids will drop off. As the drum continues to rotate, the flight will reach a point near the top of the drum at which time the flight itself will move downward due to the extra length of the securing bolt. As the flight drops, it suddenly reaches the head of the securing bolt and the shock will jar the sticky solids from the flight to completely clean it. A similar action of shock cleaning continuously takes place with the flights continuously reaching the top of the drum and the solids are thus completely agitated.

It will thus be seen that I have produced a lixiviator which is most efficient in contacting the solvent in its greatest strength with the solubles in their most reduced stage and in contacting the weakened solution with the entering materials by a continuous counter-current flow of solids and solvent. The lixiviator is completely self-cleaning and is continuous in operation as the solvent and solids enter the tank at axial points and no stop is necessary for cleaning except when a new process is carried out. The inerts are discharged separately and without contamination of other products through a gas tight seal on one end while the solution of soluble materials is separately removed at another point. The tank being gas tight is particularly suitable for reduction of solids with volatile solvents such as acids, steam or volatile mineral oils which can be recovered, condensed, and reused. Obnoxious and poisonous odors can also be controlled by the separate gas discharge conduit. Gases may also be introduced either as solvents or oxidizing agents and maintained under slight superatmospheric pressure if desired.

The lixiviator is also suitable for leaching liquids either by other liquid solutions or by gases. The liquids would pass into the feeding conveyor at the end opposite the gas or solvent feed and the gas would remove the soluble material and be drawn out at an opposite end to the feed for complete contact and reduction. Liquids can also be removed from the solids fed in, or part of the solids dissolved, and in either case, the inerts will be discharged free of the soluble material.

While I have shown a preferred form of embodiment of my invention and described the apparatus primarily with reference to leaching a solid with a liquid solvent, it will be readily apparent that being sealed against escape of gases, a gaseous solvent, under pressure if desired, may be used to remove or act upon certain ingredients in the solid, or that the same apparatus may be used for passing a gas countercurrent to a liquid with agitation of the liquid to effect removal of a portion of the liquid and scrubbing or purifying of the gas and that various modifications may be made in the apparatus without departing from the spirit of my invention or the scope of the following claims.

I claim:

1. The method of leaching soluble from inert material under superatmospheric pressure in a lixiviation apparatus which comprises, maintaining a pressure seal at each end of said apparatus, independently feeding the soluble and inert material into one end of the apparatus at a regulatable rate, feeding the solvent into the opposite end of said apparatus, rotating the apparatus, automatically conveying the solvent and soluble and inert material counter-current to each other through said apparatus and withdrawing the solvent and dissolved material from one end of the apparatus, and separating the undissolved inert material from the solvent and withdrawing the separated inert material from the other end of the apparatus while still maintaining the pressure seal.

2. The method of leaching soluble from inert material under superatmospheric pressure in a lixiviation apparatus which comprises, maintaining a pressure seal at each end of said apparatus, feeding the soluble and inert material into one end of the apparatus, feeding the solvent into the opposite end of said apparatus, conveying the solvent and soluble and inert material counter-current to each other through said apparatus, agitating the solvent and soluble and inert material together in said apparatus, and withdrawing the solvent and dissolved material from one end of the apparatus, and raising the undissolved inert material from the solution at the bottom, draining said inert material and discharging said inert material from the other end of the apparatus while still maintaining the pressure seal.

3. A lixiviator apparatus of the class described comprising a rotatable cylindrical drum, a plurality of upstanding flights secured to said drum in a substantially spiral manner to progressively advance solids through said drum, a ribbon conveyor to introduce solids containing soluble matter at one end of said drum, means to independently actuate said conveyor, a second conveyor to discharge inert matter at the opposite end of said drum, said conveyors being in substantially gas tight relation to seal said drum, solvent intake means at said insert discharge end of the drum, and a solute discharge means at the other end of the drum.

4. A lixiviator apparatus of the class described comprising a cylindrical drum, means for rotating said drum, means for feeding the solid material, and means to agitate and progressively advance the solid materials through said drum, comprising a plurality of spaced flights loosely secured to the interior of said drum for limited radial movement, said flights being self-cleaning, and adapted to move with respect to their support an amount sufficient to jar loose materials carried thereon.

5. A lixiviator apparatus of the class described, comprising a driven rotating drum, feeding means including a star feeder and a conveyor to feed solids in gas tight relation into said drum, a discharge means including a conveyor and a star feeder to discharge inerts in a gas tight relation, a solvent intake co-axial with said drum adapted to introduce solvent counter-current to said solids, means to progressively contact said solvents and said solids with the strongest solution contacting with the most inert solids, and the weakest solution with the entering solids, and means to separately and in gas tight relation remove the gases and vapors and the solvent including the soluble materials.

6. A lixiviator apparatus of the class described, comprising a driven rotating drum, feeding means including a star feeder and a conveyor to feed solids in gas tight relation into said drum, a discharge means including a conveyor and a star feeder to discharge inerts in a gas tight relation, a solvent intake co-axial with said drum adapted to introduce solvent counter-current to said solids, means to progressively contact said solvents and said solids with the strongest solution contacting with the most inert solids, and the weakest solution with the entering solids, and means to separately, and in gas tight relation remove the gases and vapors and the solvent including the soluble materials, said lixiviator having a plurality of pick up shovels to assist in removing the inerts, said pick up shovels having perforated bottoms to additionally drain said inerts.

7. A lixiviator apparatus of the class described, comprising a gear driven rotating drum, feeding means to feed solids in gas tight relation, a discharge means to discharge inerts in a gas tight relation, a solvent intake coaxial with said drum adapted to introduce solvent counter-current to said solids, means to progressively contact said solvents and said solids with the strongest solution contacting with the most inert solids, and the weakest solution with the entering solids, and means to separately, and in gas tight relation remove the gases and vapors and the solvent including the soluble materials, said lixiviator having a ported head to govern the liquid level therein, and a spiral baffle adjacent said ported head to prevent the discharge of solids in the solvent discharge conduit.

8. In a lixiviating apparatus of the type described for solids, liquids and gases, a rotating drum, stationary sealed heads at each end of the drum, means on the inside of the drum to propel a substance from one end to the other thereof, separate conveyors to introduce and remove substances through said heads, means to control the escape of gases from said drum, and means within the drum to separate the soluble material from the inerts, said means lifting the inert material out of the soluble material and depositing it on its discharge conveyor.

9. An apparatus for agitating a mixture containing solid material, and a liquid, comprising a gas tight sealed cylindrical vessel, means for rotating said vessel, a non-rotatable head on one end of the vessel, means for feeding the material to be agitated through said head into one end of the vessel, separate upstanding flights independently secured to the interior of said vessel, said flights being spirally arranged to progressively move solid materials through the vessel, a non-rotatable head on the opposite end of the vessel, means to discharge inerts through said head, and means to raise the inert material onto said discharge means, said non-rotatable heads sealing said vessel against escape of gas.

10. A lixiviator apparatus of the class described comprising a gas tight sealed rotating drum having a sealed head means to rotate the drum, means to continuously introduce solvents and solids into said drum including independently rotatable feeding means, means to continuously convey said solids and solvents in countercurrent through said drum means to raise the unreacted solids from the solution, and means to continuously and independently discharge the unreacted solids through the sealed head, whereby said lixiviator is self-cleaning.

11. A lixiviator apparatus of the class described comprising a gas tight sealed rotating drum, a fluid discharge head secured to said drum in non-rotatable manner, said head having a gas discharge conduit and a separate liquid discharge conduit, said gas discharge conduit being above the normal liquid level whereby solvents may be separately recovered and gas or vapors may be separately discharged, a second head secured to said drum in non-rotatable manner and means to separately discharge inerts from said drum through said second head, said means including a ribbon conveyor and means to load the conveyor.

12. A lixiviator apparatus of the class described, comprising a gas tight sealed rotating drum, a fluid discharge head secured to said drum in non-rotatable manner, said head having a gas discharge conduit and a separate liquid discharge conduit, said gas discharge conduit being above the normal liquid level whereby solvents may be separately recovered and gas or vapors may be separately discharged, said drum having a separate inert discharge head at the opposite end of the drum from said solvent discharge conduit and a conveyor operating through said inert discharge head whereby said inerts may be discharged substantially free of solvents.

HARALD AHLQVIST.